US009996763B2

(12) United States Patent
Han

(10) Patent No.: US 9,996,763 B2
(45) Date of Patent: Jun. 12, 2018

(54) SYSTEMS AND METHODS FOR EVALUATING SUITABILITY OF AN ARTICLE FOR AN INDIVIDUAL

(71) Applicant: Xiaofeng Han, Belle Mead, NJ (US)

(72) Inventor: Xiaofeng Han, Belle Mead, NJ (US)

(*) Notice: Subject to any disclaimer, the term of this patent is extended or adjusted under 35 U.S.C. 154(b) by 23 days.

(21) Appl. No.: 14/857,896

(22) Filed: Sep. 18, 2015

(65) Prior Publication Data
US 2017/0084035 A1  Mar. 23, 2017

(51) Int. Cl.
G06K 9/62 (2006.01)
G06K 9/46 (2006.01)
G06T 3/40 (2006.01)
G06K 9/34 (2006.01)
G06Q 30/02 (2012.01)
G06T 7/60 (2017.01)
G06Q 30/06 (2012.01)

(52) U.S. Cl.
CPC ........... G06K 9/4609 (2013.01); G06K 9/342 (2013.01); G06Q 30/0255 (2013.01); G06Q 30/0601 (2013.01); G06Q 30/0643 (2013.01); G06T 3/403 (2013.01); G06T 7/60 (2013.01); G06T 2207/10004 (2013.01); G06T 2207/10024 (2013.01); G06T 2207/20152 (2013.01); G06T 2207/20221 (2013.01)

(58) Field of Classification Search
CPC .. G06T 7/30; G06T 7/168; G06T 7/90; G06T 2207/10024; G06Q 30/0631; G06Q 30/0601
USPC .................................. 382/173, 209, 218, 305
See application file for complete search history.

(56) References Cited

U.S. PATENT DOCUMENTS

| 7,479,956 | B2 * | 1/2009 | Shaw-Weeks | A41H 1/00 345/419 |
| 7,905,028 | B2 * | 3/2011 | Sieber | A41H 1/02 33/3 C |
| 8,429,025 | B2 * | 4/2013 | Fries | G06Q 30/0603 705/26.63 |
| 9,202,281 | B2 * | 12/2015 | Wang | G06T 7/0081 |
| 2011/0142335 | A1 * | 6/2011 | Ghanem | G06F 17/3025 382/165 |
| 2011/0184832 | A1 * | 7/2011 | Wannier | G06Q 30/0269 705/26.7 |
| 2011/0274314 | A1 * | 11/2011 | Yang | G06K 9/00369 382/103 |

(Continued)

Primary Examiner — Daniel Mariam
(74) Attorney, Agent, or Firm — Brian K Dinicola

(57) ABSTRACT

A computer-implemented method executes instructions for receiving or retrieving image files. A first image file corresponds to both a scaling article image having one or more known dimension(s) and to a target article image submitted by a consumer or a vendor. Contours are determined for each article image to obtain one or more pixel dimension(s) for each article image. The pixel dimension(s) for the scaling article image are related to its known dimension(s) to obtain scaled pixel dimensions for the target article image. A consumer profile is generated which includes at least one of a set of curves that represent the determined contours and a set of control points, measure lines and control lines to represent the measurement of the reference article. Access to the profile facilitates creation of new articles for the consumer and/or assessment of how an article having a similarly derived profile will fit.

18 Claims, 10 Drawing Sheets

(56) References Cited

U.S. PATENT DOCUMENTS

| | | | |
|---|---|---|---|
| 2013/0108121 A1* | 5/2013 | de Jong | G06K 9/00 382/111 |
| 2013/0151382 A1* | 6/2013 | Fuller | G06Q 50/01 705/27.2 |
| 2014/0143096 A1* | 5/2014 | Stubert | G06T 11/00 705/26.63 |
| 2014/0358738 A1* | 12/2014 | Ohnemus | G06Q 30/0643 705/27.2 |
| 2015/0134496 A1* | 5/2015 | Grinblat | G06T 19/00 705/27.2 |
| 2016/0019624 A1* | 1/2016 | McBryer | G06Q 30/0627 705/26.63 |

* cited by examiner

FIG. 8A  FIG. 8B

SYSTEMS AND METHODS FOR EVALUATING SUITABILITY OF AN ARTICLE FOR AN INDIVIDUAL

BACKGROUND OF THE INVENTION

Field of the Invention

Embodiments consistent with the present invention generally relate to methods and apparatus for evaluating the suitability of one or more articles such, for example, as articles of apparel and sporting goods, and for fulfilling orders for such articles according to the evaluation.

Description of the Related Art

An individual shopping for articles of apparel such as shirts, pants, shoes, socks, sports jackets and the like, for sporting goods such as tennis rackets, bicycles, and skis, and for many other types of articles which must "fit" the individual, has a variety of choices and options in the marketplace. By way of example, an individual may walk into a department store or specialty store and buy an article solely based on the sizing information found on a label affixed to the article or on the packaging in which the article is wrapped. Likewise, a person may navigate to an internet site and follow the same general procedure outlined above. Although online shopping is easy and convenient, the overall quality of the fit for a particular individual can vary greatly from one article to the next.

Among the factors giving rise to variations in fit for articles of apparel having the same nominal size classification are cut selection, sizing accuracy, the manner in which one manufacturer attaches the discrete components of an article compared to that employed by another, and other factors. As such, even if a consumer is fortunate enough on one occasion to select an "off the rack" article which fits perfectly, there is a high probability that a selection made by relying on those same measurements—even during the same shopping experience—will fail to meet the consumer's expectations.

Most consumers are well aware of the fact that no two persons have an identical shape or body configuration. Those who specifically require their clothing to be well-fitted will generally seek out an establishment able to evaluate the need for, and to effectuate, alterations to pre-set standardized clothing sizes. Rarely does the "standardized" clothing precisely fit the particular body configuration of a customer. For this reason, a professional clothing salesperson must mark up the clothing for alteration and, if no inhouse tailoring capability exists, send the marked up clothing out to a tailoring shop for adjustment. When the customer returns to the retail shop for pick-up, he or she will generally try on the clothing a second time in order to ensure that proper tailoring adjustments have been made. In cases where the measuring or tailoring functions were inaccurate, the clothing will be sent back again to the tailoring shop for further adjustment. This is obviously a cumbersome, time consuming and expensive task.

During the course of an online shopping experience, an individual may encounter a sporting article or a sports related accessory, such as a bicycle, a bicycle helmet, or a tennis racket, which appears to be ideally suited for the type of sporting activity the individual would like to do. As in the case of apparel articles, there are variations in the frame and other components of a bicycle which can affect that bicycle's suitability for particular rider. The same can be said of many other categories of articles. Knowing this, online shoppers often refrain from buying bulky and expensive-to-ship items out of fear that they may not fit and need returning.

Accordingly, there is a need for improved methods and systems for carrying out the evaluation of articles in a way which does not require physical access to the consumer, and which enables the performance of various tasks involved in the manufacturing, alteration, selection, and/or delivery of such articles.

SUMMARY OF THE INVENTION

The inventor herein proposes systems and methods to facilitate evaluation and/or selection of articles for purchase by or on behalf of a consumer having access to one or more article(s) deemed by that consumer to be well-fitting (e.g., not requiring any modification), in the case of apparel articles, or well suited to a particular activity performed by that consumer, in the case of other articles. A consumer with access to an image capture device and one or more well-fitting or well-suited article(s) of remotely ascertainable dimensions or a well fitting or well-suited article of remotely unascertainable dimensions along with a secondary ("scaling") article of remotely ascertainable dimensions can generate a single image file suitable for use in accordance with embodiments of the present disclosure. According to embodiments consistent with the present disclosure, the well-fitting or well-suited article serves as a reference from which the potential fit of a commercially available article can be assessed or, in the case of apparel articles, from which a remotely disposed tailor or seamstress may fashion a custom made article.

In embodiments, a method for evaluating and/or selecting articles is executable by a computer having at least one processor and a memory containing instructions executable by the at least one processor to receive and/or retrieve one or more image files. In embodiments, a single received or retrieved image file corresponds to an image having a first grouping of pixels associated with a well-fitting or well-suited reference article and a second grouping of pixels associated with at least one scaling article having one or more discernible features of known dimension(s). In some embodiments, a received or retrieved image file corresponds to an image having a grouping of pixels associated with a reference article having one or more discernible features of known dimension(s). Each image is partitioned based on at least one of pixel location, color, intensity, or texture, and contours are determined for each article to obtain one or more pixel dimension(s) for each article. The pixel dimension(s) for the scaling article image are then related to the known dimension(s) to obtain actual dimensions for the apparel reference article, and a profile is generated. Control points and measurements are calculated on the profile of the reference article. In embodiments, the profile of a reference article submitted as a well-fitting example by a consumer, or one or more metrics derived from the profile, are compared to the profile(s) of articles(s) being evaluated for purchase.

In some embodiments, a system for evaluating and/or selecting articles available in various sizes and/or configurations, comprises at least one processor and a memory containing instructions executable by the processor to receive and/or retrieve an image file. In some embodiments, the processor is operative by execution of the instructions to at least one of receive or retrieve an image file corresponding to an image having a first grouping of pixels associated with a reference article and a second grouping of pixels associated with a scaling article having one or more discernible features of known dimension(s). In another embodiment, the processor is operative, by execution of the instructions, to at least one of receive or retrieve an image file corresponding to an image having a grouping of pixels associated with a reference article having one or more discernible features of known dimension(s). The instructions contained in memory are further executable by the at least one processor to partition each image based on at least one of pixel location, color, intensity, or texture, and contours to obtain one or more pixel dimension(s) for each article. In an embodiment, the instructions contained in memory are further executable to relate pixel dimension(s) for the scaling article to the known dimension(s) to obtain actual dimensions for the reference article, and to generate a profile. In some embodiments, the instructions contained in memory are further executable by the processor to compare the profile of a reference article submitted as a well-fitting example by a consumer (or one or more metrics derived from such profile) to the profile(s) or derived metric(s) of articles(s) being evaluated for purchase. In some embodiments, the instructions contained in memory are further executable by the processor to compare the profile of a reference article submitted as being well suited to an activity performed by the consumer (or one or more metrics derived from such profile) to the profile(s) or derived metric(s) of articles(s) being evaluated for purchase.

In yet another embodiment, a computer program product comprises a computer usable medium having a computer readable program code embodied therein. The computer readable program code is executable by a processor to implement a method for generating profile matching scores to facilitate evaluation of various articles for "fit" on behalf of a consumer and/or to determine an article's applicability to a socio-demographically definable group of consumers. In an embodiment, the code is executable by a processor to partition an image which includes an apparel article and, optionally, a scaling article, wherein the partitioning is based on at least one of pixel location, color, intensity, or texture. The code is further executable by a processor to determine, for each article, one or more pixel dimension(s) based on the partitioning. In an embodiment, the code is executable by a processor to relate the pixel dimension(s) for a scaling article image to its known dimension(s) to obtain actual dimensions for the apparel reference article image, and to generate a profile based on these dimensions. The code is further executable by a processor to calculate control points and measurements based on the profile generated for an apparel reference article. In an embodiment, the code executable by the processor causes a comparison to be made between the profile(s) of articles(s) being evaluated for purchase (or metrics derived therefrom) and the profile of a reference article submitted as a well-fitting example by a consumer (or corresponding metrics derived therefrom). The comparison process results in the generation of a matching score and/or an indication of fit quality.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 8A depicts a display terminal operated by a user to visually present, on a display thereof, a captured or received image of an apparel article to which default markings have been automatically added to highlight areas applicable and/or inapplicable to profile generation, according to one or more embodiments of the present disclosure;

FIG. 8B depicts the display terminal of FIG. 8A following execution of instructions, by a processor, to place additional markings on areas of the displayed image to be preserved for profile generation, according to one or more embodiments of the present disclosure;

Figure 1A:
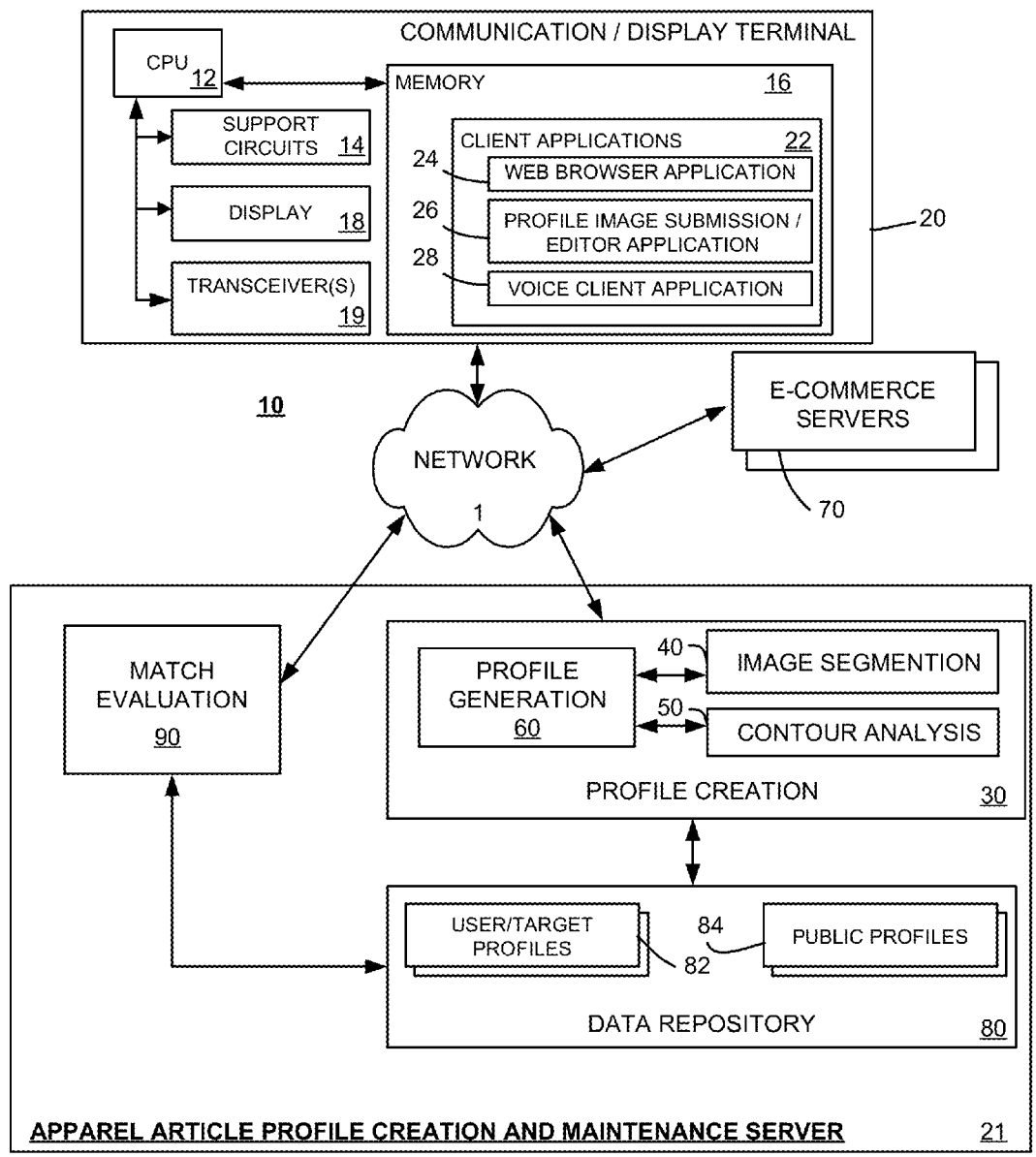
FIG. 1A depicts a block diagram of a system for managing the creation of an article profile on behalf of a consumer and/or a vendor or prospective vendor of articles, as initiated using a user display terminal, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include systems and methods for evaluating, selecting, and/or specifying articles to be or already made available for purchase by or on behalf of a consumer having access to one or more article(s) deemed by that consumer to be well-fitting (i.e., not requiring any modification) or well-suited (i.e., configured to suit performance of a particular sports or work activity by the consumer). Any consumer with access to an image capture device and either to one or more well-fitting or well-suited article(s) of remotely ascertainable dimension(s) (e.g., an article having one or more features, discernible in an image, whose dimension(s) can be determined from locally available information so as to not require real time, physical access to the article itself) or to a well fitting or well-suited article of remotely unascertainable dimensions along with a secondary article of remotely ascertainable dimension(s) can generate an image file suitable for use in accordance with embodiments of the present disclosure.

Various embodiments of systems and methods for creating, accessing, analyzing, and utilizing profiles of articles, such as apparel articles or sporting goods, based on analysis of available article images and/or specified dimensions and presenting the results of comparisons between target profiles associated with respective consumers and public profiles associated with publicly available apparel and/or other merchandise are described below. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device FIG. 1A depicts a block diagram of a system 10 which includes an end user device 20 ("communication display terminal") for managing submission and user input into a process for generating an article profile according to one or more embodiments consistent with the present disclosure. The display terminal 20 comprises Central Processing Unit (CPU) 12, support circuits 14, a memory 16, a display device 18, and transmission and receiving devices ("transceivers") 19. In some embodiments display terminal 20 is a mobile terminal such, for example, as a smartphone, personal digital assistant (PDA), tablet computer, or wearable computer, and the transmission and receiving devices 19 comprise one or more wireless transceivers compliant with corresponding wireless transmission protocol(s) such as IEEE 802.11, IEEE 802.13, Bluetooth, and/or cellular transmission protocols such as CDMA, TDMA, and/or GSM. In other embodiments, the display terminal 20 may comprise a desktop computer, a notebook computer, or a laptop computer and the links between display terminal 20 and a communication network 1 are not limited to wireless links but, instead, may comprise utilize any suitable medium such, for example, as electrical power wiring, optical fiber, premises LAN cabling or the like.

The CPU 12 may comprise one or more commercially available microprocessors or microcontrollers that facilitate data processing and storage. The various support circuits 14 facilitate the operation of the CPU 12 and include one or more clock circuits, power supplies, cache, input/output circuits, and the like. The memory 16 comprises at least one of Read Only Memory (ROM), Random Access Memory (RAM), disk drive storage, optical storage, removable storage and/or the like. In some embodiments, the display device 18 may be a touch screen able to accept input from a user's finger or input from a stylus. In some embodiments, the memory 16 comprises an operating system (not shown in FIG. 1A) and one or more applications 22. In some embodiments, applications 22 include a web browser application 24 and a communication client application 28 configured, by execution of instructions by CPU 12, to set up a telephone call, to send and receive SMS or MMS messages, and/or to send and receive e-mail messages to or from another entity with authorized access to network 1.

The network 1 comprises one or more communication systems that connect computers by wire, cable, fiber optic and/or wireless link facilitated by various types of well-known network elements, such as hubs, switches, routers, and the like. The network 1 may include one or more of an Internet Protocol (IP) network, a public switched telephone network (PSTN), and/or other mobile communication networks, and may employ various well-known protocols to communicate information amongst the network resources.

In some embodiments, applications 22 further include a profile image submission and editor (PISE) application module 26 while in other embodiments, the profile submission and editor application is hosted by a remote server. Thus, the functions of the PISE module 26 may be performed entirely at the display terminal, entirely at a remote server, or they may be distributed between these. In the latter two cases, some or all of the functions of the PISE module may be implemented locally at the display terminal 20 via web browser application 24. In some embodiments, the communication display terminal 20 includes an image capture device (not shown) which is operable by a user of terminal 20 to acquire an image of an article such, for example, as an article of apparel. According to an embodiment, the article of apparel is selected by a user of display terminal 20 as the target of image acquisition because it is deemed by that user to be well-fitting, such that a profile based on that article ("reference article") facilitates the evaluation of commercially available articles for which public profiles are available, or the creation of new articles responsive, for example, to the user's request(s). According to other embodiments, the image capture device may be used to acquire an image of anther category of reference article. For example, in the context of bicycling, a user may acquire one or more images of a favorite bicycle frame, or of a helmet. In the context of tennis, a user may acquire one or images of a tennis racket. In the context of carpentry, a user may have a particular hand or power tool which is especially favored.

It is not necessary for the display terminal 20 to include, or even be connected to an image capture device. What matters is that the profile image submission and editor application (PISE) module 26 (whether implemented entirely as a local application, entirely remotely by connection to a server, or as some hybrid of these two) has access to an image file which contains either an image of an article of apparel for which there is at least one known dimension (e.g., a dimension such as the maximum width or height) or an image of an article for which there is no known dimension together with a scaling article (e.g., a ubiquitous article having a well known or readily ascertainable dimension in the same field of view as the reference article upon image acquisition). By way of illustrative example, a dimension is readily ascertainable if it can be determined by reference to the image itself (e.g. by reference to data previously or contemporaneously supplied by a user or some other party, or by a common understanding or convention). As such, PISE module 26 may be used to process an image received from another device as, for example, a file transferred or retrieved from local storage and/or downloaded or received from a remote location via network 1.

As explained in greater detail below, the role of the image processed by PISE module 26 is to provide the basis upon which a standardized "target" profile can be derived and, in some embodiments, used in an automated process executable as instructions by a processor to determine the closeness of a match with one or more public profile(s) associated with commercially available articles of the same type. Depending upon the degree of match between a target profile and a public profile, a potential consumer and/or vendor is given a higher (or lower) assurance and/or confidence that an apparel article acquired in an e-commerce transaction—via interaction with one or more of e-commerce servers 70—will fit as well or at least nearly as well as the article from which the target profile was derived. In other embodiments, a supplier of custom-fitting clothing may offer well-fitting or well-suited articles to specific consumers or groups of consumers by reference solely to a set of one or more target profiles. Likewise, a higher (or lower) assurance and/or confidence that a bicycle frame, bicycle helmet, tennis racket, or tool will suit a particular user as well as an applicable reference article.

As noted above, the entire process of profile generation may be performed by display terminal 20 by, for example, execution of instructions by CPU 22. However, in the embodiment depicted in FIGS. 1A and 1B, the reference apparel article image(s) captured by display terminal 20 are submitted by communication display terminals such as display terminal 20 as an image file transmitted via network 1 to an apparel article profile creation and maintenance server 21.

With continuing reference to FIG. 1A, it will be seen that creation and maintenance server 21 includes a profile creation module which includes an image segmentation engine 40, a contour analysis engine 50, and a profile generation module 60. According to embodiments consistent with the present disclosure, image segmentation engine 40 partitions an acquired or retrieved image into groups of pixels, and at least one of these groups corresponds to a reference article of apparel. In an embodiment, pixels are grouped according to color, intensity, and texture. A principal objective of segmentation is to distinguish the reference article and, if present, a scaling article, from the image background so that these can be subjected to further processing by contour analysis engine 50. According to some embodiments, the background is removed after segmentation and what remains is converted to a grayscale image. Contour analysis engine 50 then employs a contour finding algorithm to identify the contours of a reference apparel article and, if applicable, the scaling article. In embodiments, the contours are represented as 2 dimensional mathematical curves according to an iterative process which a user can terminate as soon as he or she is satisfied with the visually displayed results. The results of the above-described segmentation and contour analyses are used by profile generation module 60, the output of which is provided to a data repository 80 comprising user/target profiles 82 and public profiles 84.

In some embodiments, a match evaluation engine 90 generates a match score which serves as an objective characterization of fit for use, for example, by a user seeking to evaluate commercially available articles of apparel for which a public profile is available.

The image segmentation process admits of substantial variation, and any conventional technique or combination of techniques capable of isolating groups of pixels corresponding to one or more articles of interest from a background may be employed. In that regard, image segmentation is a well-studied problem to which many solutions have been proposed. Examples of segmentation approaches available for implementation under open source licensing terms are embodied by such source code libraries as ImageJ, ImageMagick, ITK and OpenCV, to name a few. In an embodiment, two such segmentation approaches are employed. For a rapid or "first pass" segmentation, a Watershed transformation—as described by Serge Beucher and Christian Lantuej in "Use of watersheds in contour detection", *International Workshop on Image Processing*, CCETT/IRISA, Rennes, France (1979), is employed by execution of instructions associated with segmentation engine 30. Then, to get a more precise segmentation, a Graph-cut method is implemented by execution of instructions associated with segmentation engine 30.

In a Watershed transformation according to embodiments consistent with the present disclosure, some parts of an image are assigned the status of high points while other parts are assigned the status of low points. A user identifies the low points of foreground and background by marking corresponding areas of an image. Water sources are then placed at these low points, and the resulting flow results in a flooding of the entire image. The water sources continue the flooding until they meet and this defines the barriers which separate the foreground and background.

Segmentation according Graph-cut techniques, according to embodiments consistent with the present disclosure, treats pixels of the image containing a reference article and, optionally, a scaling article, as nodes in a graph. Adjacent pixel nodes are connected by a weighted edge, such that the weights on the edges of a node are determined by the similarity of its neighbors. In this case, the user markings are used to distinguish foreground pixels ("source") from background pixels ("sink") wherein the image is turned into a weighted graph with a source and a skink. The object of the segmentation task is thus transformed into finding a cut in the graph that separates the source and sink and optimizes the flow across the cut. By way of illustrative example, a user of communication terminal 20 using web browser application 24 to access remote PISE functionality, or a local instantiation of PISE application 26 is, in some embodiments, prompted or instructed to place foreground marks on portions of an image corresponding to a reference article and, if present, to a scaling article of known dimensions, and also to place background marks on one or more portion(s) of the image corresponding to the background. In some embodiments, one or more initial markings may be rendered automatically to the display 18 of terminal 20 based on a default presumption that the reference article is at the center of the acquired image.

Figure 1B:
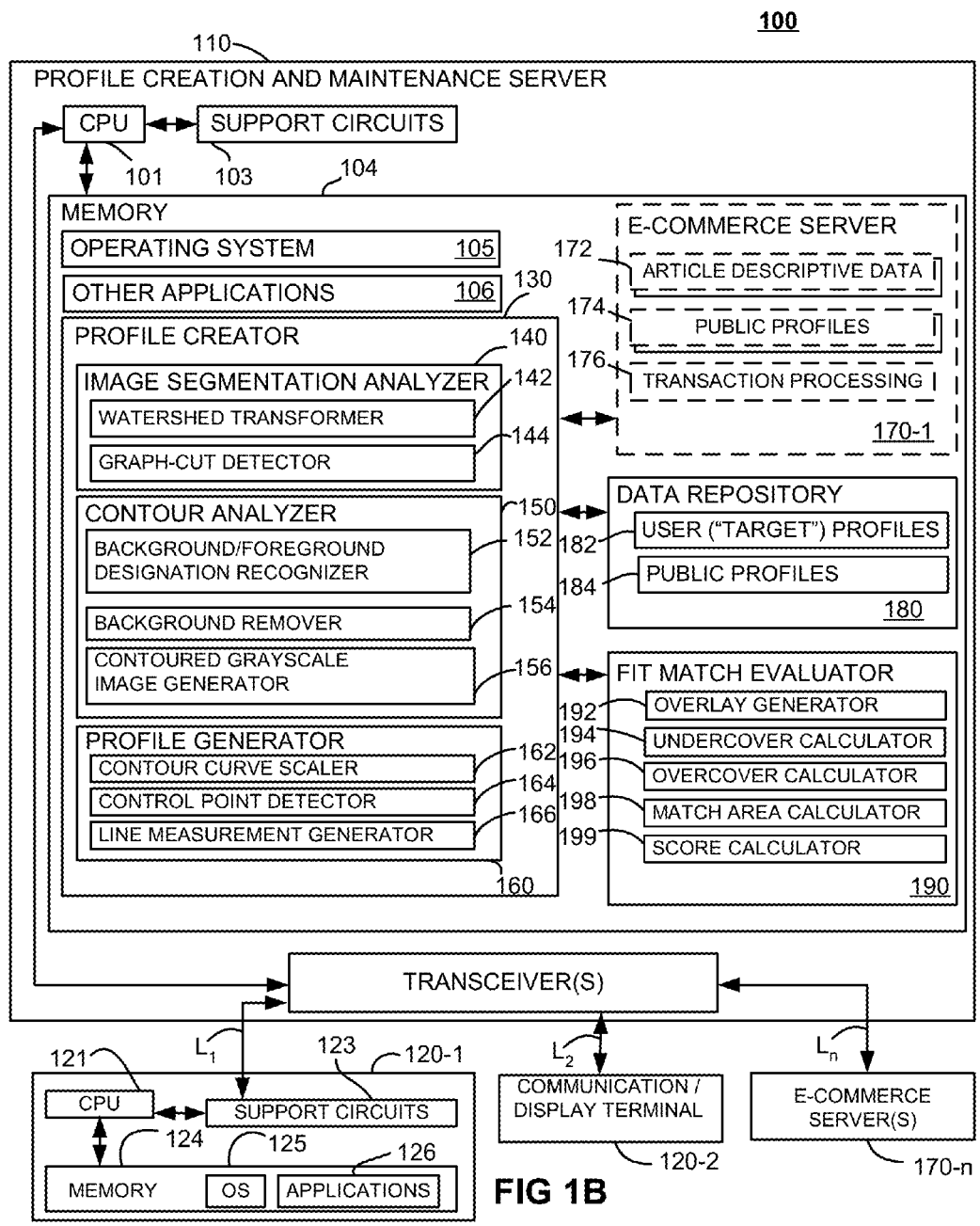
FIG. 1B depicts a block diagram of a system for creating and matching of article profiles for consumers and/or vendors or prospective vendors of articles, as performed at a server, according to one or more embodiments of the invention.

FIG. 1B depicts a block diagram of a system 100 for the creation and matching of article profiles for consumers and/or vendors or prospective vendors of articles, as performed at a server 110 according to one or more embodiments of the invention. Server 110 is connected via one or more transceivers, and suitable network connections $L_1$ to $L_n$, to communication display terminals as 120-1 and 120-2, as well as to e-Commerce server(s) 170-$n$. As described in connection with FIG. 1A, a user of a communication terminal as terminal 120-1 may submit an image for processing and, as well, utilize such terminal to make appropriate markings for segmentation as also described above.

The server 110 comprises Central Processing Unit (CPU) 101, support circuits 103, a memory 104, and transmission and receiving devices 112. In some embodiments server 110 comprises one or more wireless transceivers compliant with corresponding wireless transmission protocol(s) such as IEEE 802.11, IEEE 802.13, BLUETOOTH, and/or cellular transmission protocols such as CDMA, TDMA, and/or GSM. Each of the communication terminals, as terminal 120-1, also comprises a CPU 121, support circuits 123, and a memory 124 having stored therein executable code corresponding to an operating system 125 and client applications 126 (as exemplified by client applications 22 in FIG. 1A). In embodiments, the communication terminals as terminal 120-1 includes a display device such as a touch screen able to accept input via movement of a stylus or a user's finger. In some embodiments, applications 126 include a communication session module configured, by execution of instructions by CPU 121, to set up a telephone call and/or send an SMS or MMS message to an intended recipient via one or more links (not shown) of a communication network 127.

CPU 101 may comprise one or more commercially available microprocessors or microcontrollers that facilitate data processing and storage. The various support circuits 103 facilitate the operation of the CPU 101 and include one or more clock circuits, power supplies, cache, input/output circuits, and the like. The memory 104 of server 110 comprises at least one of Read Only Memory (ROM), Random Access Memory (RAM), disk drive storage, optical storage, removable storage and/or the like. In some embodiments, the memory 104 comprises an operating system 105 and one or more applications 106. According to embodiments consistent with the present disclosure, memory 104 also contains instructions, executable by CPU 101, corresponding to a profile creator 130, one or more optional e-commerce servers as server 170-1, which includes article descriptive data 172, public profiles 174, and transaction processing instructions 176 for consummating ordering and/or sales transactions, and a data repository 180 which includes user "target" profiles 182, corresponding to profiles associated with one or more well fitting articles selected by a user, and public profiles 184, corresponding to profiles associated with articles which a supplier or vendor has made commercially available via, for example, one of the e-commerce servers as server 170-1. Memory 104 further includes a fit match evaluator indicated generally at 190, the operation of which is to be described in greater detail shortly.

As discussed previously in connection with FIG. 1A, profile creator 130 includes a segmentation analyzer 140 which, in an exemplary embodiment, includes both a watershed transformer 142 and a graph-cut detector 144. Also consistent with the FIG. 1A as previously described, profile creator 130 further includes a contour analyzer 150 which includes a background/foreground designation recognizer 152, background remover 154, and a contoured grayscale image generator 156. Finally, profile creator 130 includes a profile generator 160 that includes a contour curve scaler 162, a control point detector 164, and a line measurement generator 166.

As noted previously, a profile in accordance with embodiments of the present disclosure consists of a set of curves which represent the contours—found by image segmentation and contour analysis—for a reference article or an article made available commercially for sale by one or more vendors (each, referred to as a "target article" herein). A profile according to some embodiments further includes a set of control points, measure lines, and control lines which, collectively, represent the measurements of each apparel item. A profile may be represented by any suitable mathematical or computer object to be stored, transported, displayed, and/or manipulated. In one embodiment, a profile is represented by a Scalable Vector Graphic (SVG) file on a client's machine (e.g., communication terminal, computer, etc). and is stored as various records in a server database (e.g., public profile 174 of e-Commerce server 170-1, or as private and public profiles 182, 184 in data repository 180).

According to embodiments consistent with the present disclosure, contour curves may be any two-dimensional mathematical curve such as Bezier, B-spline, or connected line segments. In an embodiment, profile generator 160 is configured to employ Bezier curves in the interests of both accuracy and simplicity. A contour is typically represented by a linked list of line segments, with a contour starting at the point with the highest y-value in an x-y orthogonal coordinate system. Because contours are expressed as equations, minimum and maximum values may be readily calculated for each segment and for a contour as a whole. Likewise, such things as the area of a contour, the centroids of a contour, and arc length can also be readily determined.

According to embodiments, profile generator 160 includes a contour curve scaler 162. In one embodiment, the height (or any other known dimension) of a reference article is used by contour curve scaler 162 to scale the curves of a profile. According to other embodiments, the presence of a scaling article of known dimensions, in the same image as the reference article, is used to perform the scaling. In the former case, for example, if the height or any other dimension of the reference article is known, contour curve scaler relates the pixel dimension of that article to the actual dimension, such that the remaining curves of the contour are scaled to their actual dimensions. In the latter case, the scaling article of one or more known dimensions is used by contour curve scaler 162 to perform the requisite scaling. Suitable examples of scaling articles which may be readily identified in an image following segmentation include a CD disc (which has a diameter of 4.72 inches) or a piece of A4 paper, which is 8.27×11.02 inches. By relating the pixel dimensions of a scaling article with its known dimension(s), the contour curves of a reference article derived from the same image can be readily scaled to their actual dimensions. It should also be noted that if a user has a favorite scaling article which does not have a universally recognizable set of one or more characterizing dimensions, then he or she may save the dimensions of that item and associate it with his or her profile. Such values may be used as defaults and save a user from having to identify the scaling article within an image each time a reference article is to be submitted.

Within continuing reference to FIG. 1B, and as noted previously, profile generator 160 further includes control point detector 164. As used herein, each control point is a point in a profile which identifies an important feature of an article. For an apparel article such as a shirt, a set of one or more control points may identify the end of a shoulder or of a sleeve. For pants, the control point(s) may identify the crotch. As used herein, measure lines are those lines which connect a pair of control points to give an actual measurement. In an embodiment, control point detector 164 finds control points based on the known geometric properties of the contour curves. For different profile types and/or article types, these properties vary, so the methods to calculate the control points can vary accordingly. There are many geometric properties of a profile that can be exploited to calculate control points, and so long as these yield objectively valid results, any of them may be utilized. Specific details about the process of computing control points will be described in greater detail shortly.

In embodiments, control lines are horizontal lines that cut across contour curves. When dragged up and down the SVG file, they can give a set of measurements. In an embodiment, line measurement generator 166 records the y-coordinate of control lines as or after they are dragged into position. This y-coordinate is then used to calculate the intersections of the contour curves. Since the curves are represented by cubic equations, the intersections between them can be found by solving these equations. In embodiments, an intersection is found by considering a segment or portion of a contour curve rather than the curve in its entirety. Resolving a curve into segments in such a manner reduces computational complexity and, more importantly, enables only valid intersections to be identified. The way to segment a curve to quickly find a solution may be highly dependent upon the shape of a curve and what kind of solution is to be obtained. According to embodiments, measurement lines and control lines derived in the foregoing manner comprise actual size measurements of an article profile.

After profiles have been generated by profile creator 140, they can be matched to, for example, give an indication of how similar a first profile (e.g., for a reference article) is to a second profile (e.g., a commercially available article of the same category as the reference article). A group of two or more articles are deemed to be of the same category, for purposes of performing fit matching, when they have the same number of contours in their respective profile. In this regard, and as already noted above, embodiments of a profile creation and maintenance server 110 consistent with the present disclosure include a fit match evaluator 190. Fit match evaluator comprises an overlay generator 192, an undercover calculator 194, overcover calculator 196, match area calculator 198, and score calculator 199.

According to embodiments consistent with the present disclosure, a user of a communication terminal, as terminal 120-1, acquires images and by interacting within server 110, creates profiles based on his or her best-fitting clothing items. These are then used to match against public profiles that a remotely located vendor is offering for sale via, for example, an e-commerce website. For an article of apparel which comprises only a single contour such, for example, as a T-shirt, overlay generator 192 overlays. In an embodiment, overlay generator 192 performs this overlaying function by finding the centroid of each contour and then aligning the two contours by their top and x-coordinate (horizontal) of their centroids. In another embodiment, overlay generator 192 superimposes a grid system over the contours and aligns the contours along grid lines, for each of a plurality of alignments, computes respective scores, and selects the best score among the different alignments. As will be readily ascertained by those skilled in the art, the greater the number of grid lines (or lower the spacing between them), the greater the accuracy and computational complexity. For simple, single contour articles, the inventor herein has determined that the centroid overlay technique is both computationally efficient and faster, and yet is still able to produce satisfactory results.

In some embodiments, fit match evaluator 192 is further responsive to user input, rendered via a communication terminal as terminal 120-1, to enable optimization of the overlay. In an embodiment, a user may input, via a user interface presented at the communication terminal, to change the overlay by moving a candidate profile around on top of the target profile via "drag and drop" movements. In some embodiments, the user interface is further configured to enable the user to alter the orientation of one profile relative to the other (e.g., by rotating the candidate profile relative to the target profile) so as to further improve the matching score by interactively and/or iteratively adjusting the overlay.

In embodiments consistent with the present disclosure, undercover calculator 194 of fit match evaluator 190 calculates the area that is covered by the target profile contour but not covered by the candidate profile contour. This area is referred to herein as the "undercover" of a match. Likewise, overcover calculator 196 of fit match evaluator 190 calculates the area that is covered by the candidate profile contour but not covered by the target profile contour. This area is referred to herein as the "overcover" of a match. Match area calculator 198 of fit match evaluator 190 computes a value representing the area covered by both the target and the candidate's contours. This is referred to herein as the "match area" of a match.

The overcover, undercover and match areas may be computed using any suitable computational geometry algorithm. In an embodiment, these areas are determined by utilizing the inherent ability of image software to render images with alpha values. For example, a target profile contour is first drawn with a color having an alpha value of 1.0. Then, a candidate profile contour is drawn over it with a different color having an alpha value of 0.5. Now, the undercover, overcover and match area will all have different colors. Fit match evaluator 190 need then only scan through the drawing's image buffer and count the number of pixels of three different colors to find the respective areas.

In some embodiments, score calculator 199 of fit match evaluator 190 computes a score by looking at the percentage of mismatched parts (undercover and overcover) over the area of the target profile contour. In calculating the score, weights may be given to different areas to express preferences of the match algorithm. In an embodiment, the following formula is used by score calculator 199 to arrive at a matching score:

$$SCORE=100.0*(1.0-(A_{UNDERCOVER}*3.0+A_{OVERCOVER}*1.5)/(A_{TARGET}))$$

where: Target Area$(A_{TARGET})$=$(A_{UNDERCOVER}+Area_{MATCH})$ and: Score<0.0, it is set to 0.0

For profiles having more than one contour as, for example, a pair of pants, each contour score may be scored separately by score calculator 199, and then a weighted average can be computed to arrive at the score for the whole profile. Using the above described formula, a score above 85 may be deemed to indicate that the candidate profile contour corresponds to an article that is a "pretty good" or acceptable fit, while anything below a 75 may be excluded. Those candidate profiles falling between these two values may be borderline. In embodiments, the user interface executing at a communication terminal may be configured to display an indication of fit as "good", "fair", "questionable" or "poor" via, either color codes, a linear scale with a pointer, a numeric score, alphanumeric indicator, or some other suitable means by which a user may qualify a candidate article of apparel.

After profiles are created and stored in a database as data repository 180, they may be made available for search or evaluation by members of the public, specifically identified persons authorized by a user, vendors of commercially available clothing, or even remotely located tailors who may wish to customize an offer to an individual user or to a group of users fitting a particular socio-demographic profile (e.g., age, gender, place of residence, income or a combination of these) or with whom they have a pre-existing relationship. In an embodiment, one may conduct a search of public profiles starting with a target profile as previously defined. The goal may be to search the database(s) 184 and/or 174 and identify those public profiles having a score equal to or greater than a threshold value (e.g. 85). Since computing a matching score is computationally expensive, a "brute force" technique of pulling up each profile in the database, in seriatim, and calculating a score against a target would take too much time and not be practical in most cases.

According to embodiments, some additional dimensional data is stored along with each public profile to simplify the matching process. In an embodiment, the width, height and area of the public profile contours are stored in the database. Using the target profile contour's dimensions (width, height, area), only those candidate profiles of a similar type and whose contour's dimensions only deviate from the target by less than a threshold percent are selected. This threshold may depend substantially according to the implementation. For example, a smaller value may return fewer profiles and therefore be computationally efficient, but it may also reduce the number of candidates to an unacceptably low number on a statistical basis. Likewise, a higher threshold value might relax the matching criteria to the point of unnecessary complexity. It is expected that a threshold on the order of ten percent represents an appropriate compromise between those two extremes.

According to an embodiment, for each candidate profile returned after dimensional threshold filtering as described above, its matching score is calculated against the target profile and the former is discarded if the matching score is determined to be less than a threshold (e.g., 85). The scoring process continues until all candidate profiles meeting the filtering criteria have been scored or, in some embodiments, a certain numerical limit (e.g., 20) has been reached. The results are then displayed to the user. In an especially preferred embodiment, information (i.e., pricing data, images, or links to the foregoing) for each candidate profile having an acceptable matching score is transmitted to or presented to the user, or the availability of the same for download is communicated to the user, contemporaneously with the identification of such profile. Such an arrangement is preferred because the matching process will typically take time to complete and should be allowed to proceed asynchronously. In other words, a user need not be forced to wait for all matching scores to be computed but instead the scores and associated information may be sent as it becomes available.

Figure 2:
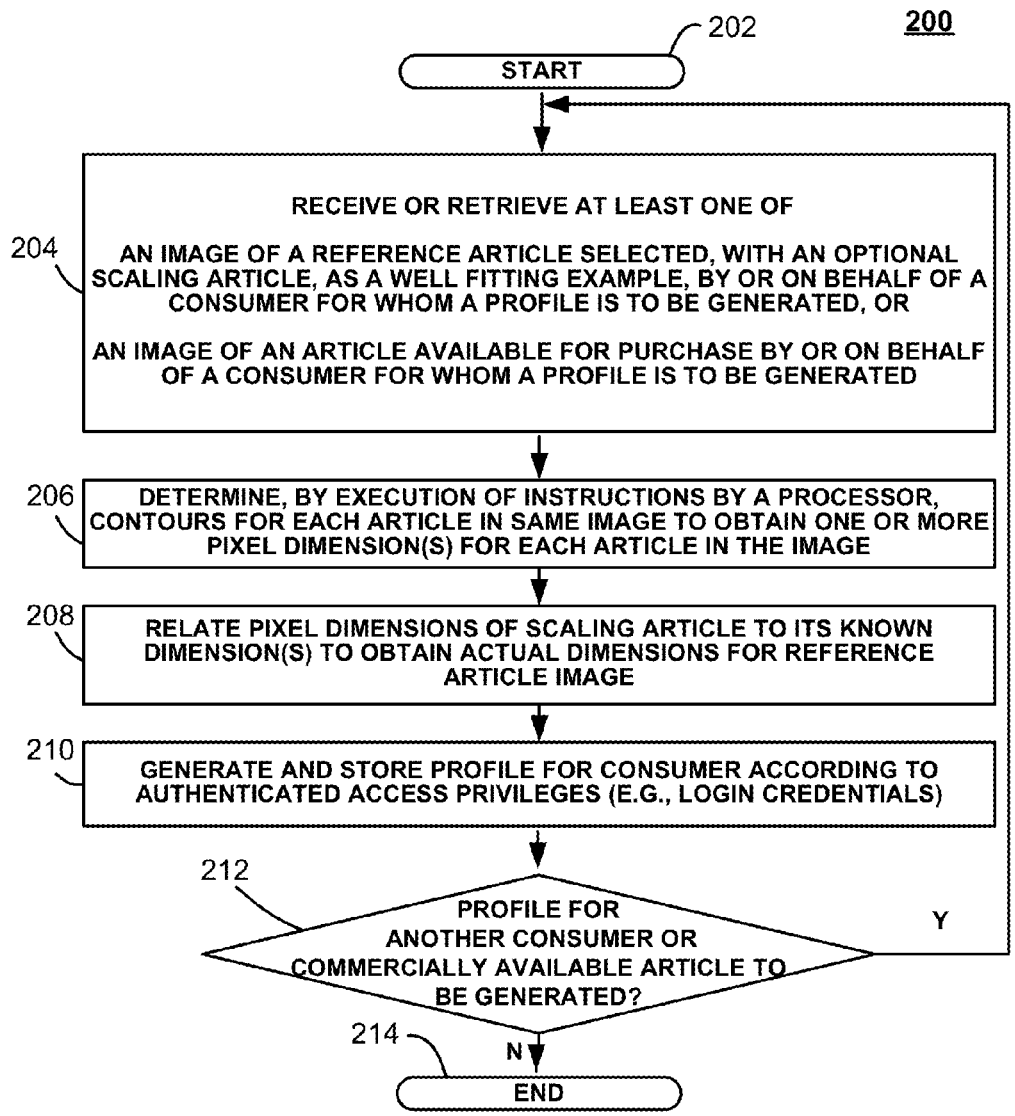
FIG. 2 is a flow diagram of a method for managing the creation of article profiles according to one or more embodiments of the present disclosure.

FIG. 2 is a flow diagram of a method 200 for managing the creation of article profiles according to one or more embodiments of the present disclosure. The method 200 is entered at 202 and proceeds to 204 where the method receives or retrieves one of two categories of images. In an embodiment, a first category of image is that of a reference article selected by a user for whom a profile is to be generated, or by another party acting on such user's behalf, to be a well fitting or well-suited example. A second category of image is that of an article available for purchase by or on behalf of a consumer for whom a profile is to be, or already has been, generated.

In some cases, the article or articles which are the subject of the received or retrieved image may possess one or more machine discernable features having standard, universally accepted dimensions or dimensions previously identified by a contributor. The presence of such features in an image, according to one or more embodiments, permits the dimensions of all article identified therein to be ascertained after image analysis. If no such features exist, the received or retrieved image further includes a "scaling" article of generally accepted or contributor-identified dimensions. Here again, the presence of such an article in image, according to embodiments, permits the dimensions of the other article or articles in the same image to be determined. The method 200 then proceeds to 206.

At 206, method 200 determines, by execution of instructions by a processor, the contours for each article in the same image to obtain one or more pixel dimension(s) for each article in the received or retrieved image. From 206, the method 200 proceeds to 208. At 208, in the case where details from which the dimensions of the article or articles can be derived are unknown, method 200 relates the pixel dimensions of a scaling article to its known dimension or dimensions in order to obtain actual dimensions for the article(s) present in the image. Alternatively, where such details are known, then method 200 relates the pixel dimension(s) of the known feature(s) or portion(s) of an article in an image to the true dimension(s) associated with such feature(s) in order to obtain actual dimensions for the article(s) present in the image. From 208. Method 200 proceeds to 210.

At 210, method 200 generates and stores a profile for each of the articles subjected to the process steps associated with 202 to 208. The profile is associated with the account of a user, who may be a consumer, an e-commerce vendor of articles, the producer of articles, or a party having an interest in ascertaining the actual or potential needs of a single consumer, a group of consumers, or a population segment for which enough consumer profile data is available to reach statistical significance. In embodiments, authenticated access privileges are given to individuals and/or business entities such that they may perform one or more of profile generation activities, match scoring activities, and/or market analysis activities, in accordance with the respective needs and subscription level of such individuals or entities. The process proceeds to 212, where method 200 determines whether or not another profile is to be generated for another article (whether on behalf of the same consumer, a different consumer, the same vendor or manufacturer, or another vendor or manufacturer). If the determination at 212 is yes, the method 200 returns to 204 and the above-described sequence is repeated. If the determination at 212 is no, then method 200 proceeds to 214 and terminates.

Figure 3:
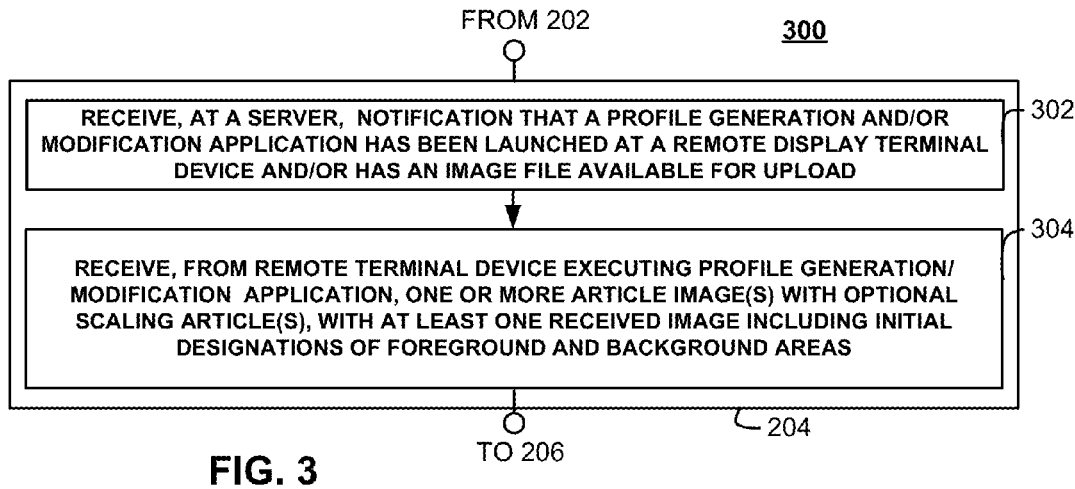
FIG. 3 is a flow diagram of a method for facilitating the creation of article profiles using article images created, received and/or edited at a user display terminal as, for example, a sub-process of the method of FIG. 2, according to one or more embodiments of the present disclosure.

FIG. 3 is a flow diagram of a method 300 for facilitating the creation of article profiles using images created, received and/or edited at a user display terminal as, for example, a sub-process of the method 200 of FIG. 2, according to one or more embodiments of the present disclosure. The method 300 is entered, in this example, at 302. At 302, method 300 receives, at a server, a notification that a profile generation and/or modification application executed, for example, at a remote display terminal such as a smartphone, tablet computer, or the like, has been launched and/or has an image file available for upload.

Alternatively, the functionality of the profile generation and/or modification application may be launched, at the server, via a web browser application executing on the remote display terminal. From 302, the method 300 proceeds to 304, where method 300 receives, from the remote terminal device, an image file containing the images of one or more target articles and, optionally, a scaling article, where at least one of the images includes initial designations of foreground and background areas. In an embodiment, areas of an image corresponding to portions of the target article(s) and, if present, scaling article, are marked as foreground areas, while areas corresponding to the background are marked by the user in a manner which distinguishes them from the foreground area(s). In an embodiment, instructions to utilize a mouse or touch screen interface to add such markings are rendered to the display, and following their entry, a user may be prompted to confirm their locations. In some embodiments, the markings are placed on the image and stored with the image file before uploading. In other embodiments, the server transmits data to the remote terminal such that a graphical user interface containing the target articlel(s) and optional scaling article, together with a tool bar for placement of the aforementioned markings are made and confirmed for remote processing. Following 304, method 300 returns to 206 of method 200.

Figure 4:
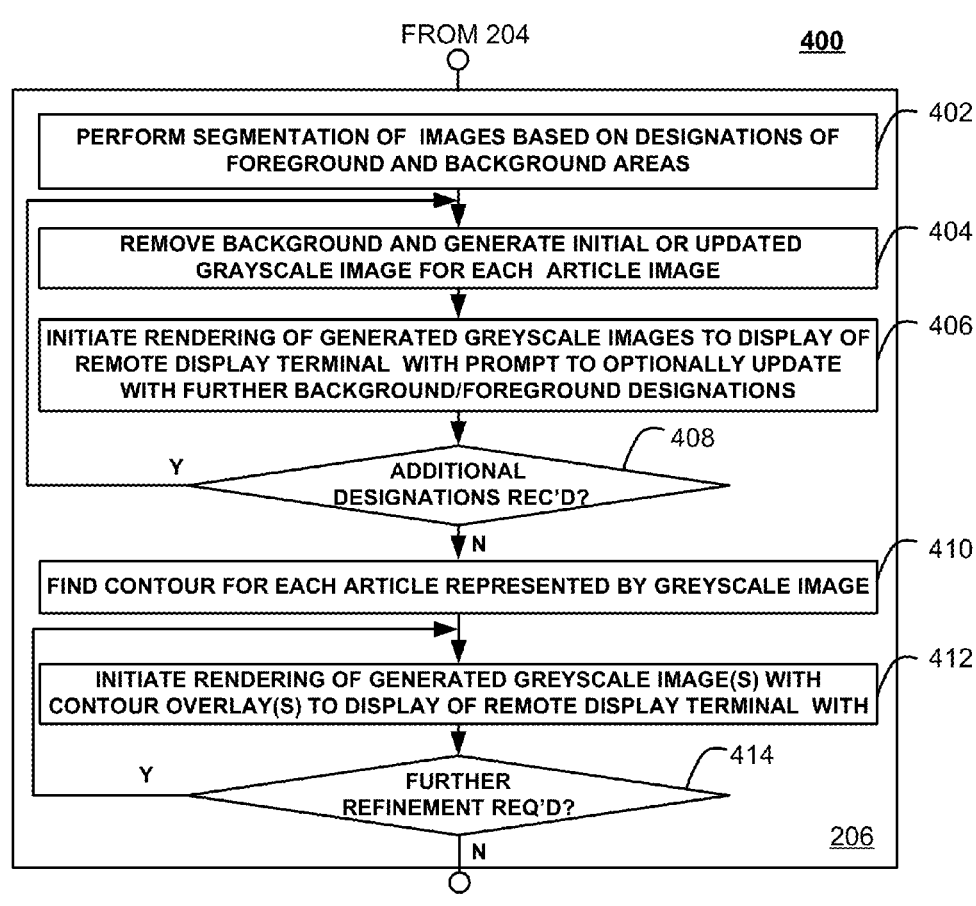
FIG. 4 is a flow diagram of a method for determining contours of the article(s) to be included in a profile as, for example, a sub-process of the method of FIG. 2, according to one or more embodiments of the present disclosure.

FIG. 4 is a flow diagram of a method 400 for determining contours of the article(s) to be included in a profile as, for example, a sub-process of the method 200 of FIG. 2, according to one or more embodiments of the present disclosure. The method 400 is entered at 402 and is performed, in this example, at a server following receipt of image data representative of at least one of an article image having at least one feature for which dimensional data is locally accessible by the server or of an article image for which dimensional data is not locally available to or accessible by the server together with a scaling article for which dimensional data is locally available to and/or accessible by the server. At 402, method 400 performs segmentation of the apparel article image(s) and optional scaling image, based on designations of foreground and background areas submitted by a user.

Segmentation is the process of partitioning an image into groups of pixels that are of interest. In an embodiment, the groupings of pixels are based on the pixel location, color, intensity and texture with the objective being to find one or more target article(s) and, if present, a scaling article so that they can isolated from the background for subsequent processing. As noted above in the discussion of FIG. 1B, any available segmentation algorithm suitable for distinguishing foreground and background areas may be utilized. In an embodiment, a combination of Watershed transformation and Graph cuts processing are used to isolate those portions of an image identified by a user as being foreground area(s), as by the markings included in the received image(s), from those portions of an image associated with the background area(s). In some embodiments, a user may be required to place foreground marks on both an apparel article (e.g., a shirt, coat or pants) and a scaling article, and also to place background marks on the background area(s). In an embodiment, the method 400 may implement an automated marking function by placing a mark at the center of a displayed image, the placement of the mark being based on the premise that the apparel article is at the center of the displayed image.

Turning briefly to FIGS. 8A and 8B, there is depicted in FIG. 8A a display terminal 800 operated by a user to visually present, on a display 802 thereof, a captured or received image containing an apparel article 804 (to which default foreground marking 812*a* and default background areas 810*a*, 810*b*, 810*c* and 810*d* have been automatically added to highlight areas applicable and/or inapplicable to profile generation, according to one or more embodiments of the present disclosure. In this embodiment, a scaling article 806 is also present.

FIG. 8B depicts the display terminal 800 of FIG. 8A following execution of instructions, by a processor, to place additional markings—representing designations placed there by the user—on areas of the displayed image to be preserved or removed for purposes of profile generation, according to one or more embodiments of the present disclosure. In an embodiment, the user may elect to mark areas for removal by clicking on the "Mark to Remove" radio button and then adding additional markings via mouse movement or touch-screen entry. Likewise, the user may elect to mark additional areas as foreground, like 812*c* over the scaling article 814, after clicking the "Mark to Keep" radio button.

Returning to FIG. 4 it will be seen that method 400 proceeds from 402 to 404, where the method 400 removes the background portion 808 of the image and, in some embodiments, proceeds to 406 where the display of the user display terminal is updated so that only the target article(s) and optional scaling portion represented by the image data are rendered. The designation marking and background removal processes of 402 and 404 may be performed iteratively. As such, 406 may comprise rendering of generated grayscale images to the display of a remote display terminal with a prompt for the user to optionally update with further background and/or foreground designations. At 408, the user may either confirm that no such optional designations will be forthcoming, such that method 400 proceeds to 410, or the user may make further input, such that method 400 proceeds to 404 for one or more additional iteration(s).

Once the image is segmented, the background is removed over one or more iterations, and what remains is turned into a final grayscale image, method 400 proceeds to 410, where the contour of each article (e.g. reference apparel article(s) and optional scaling article) is found. Any suitable technique for finding the contour may be employed for this purpose. In an embodiment, the technique described by S. Suzuki and K. Abe in a paper entitled "Topological Structural Analysis of Digitized Binary Images by Border Following", CVGIP, 30 1 pp 32-46 (1985) is employed to find the article contours. In accordance with that method, the contours are represented as two-dimensional (2D) mathematical curves which form closed curves starting at the point with the highest Y-value in an X-Y orthogonal coordinate system.

Figure 8C:
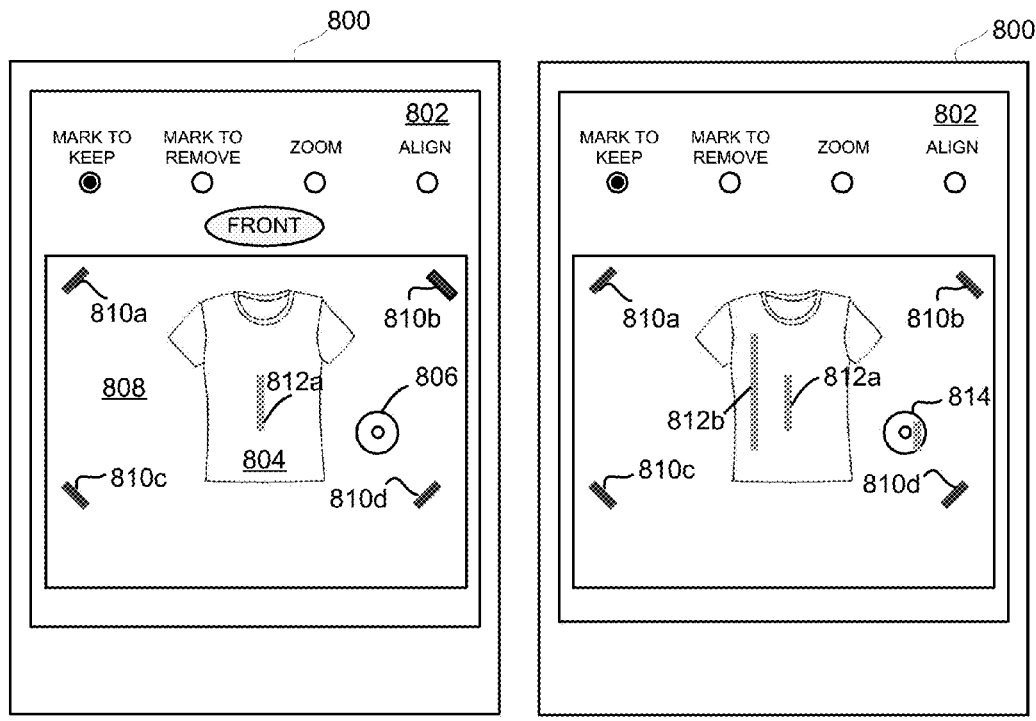
FIG. 8C depicts the display terminal of FIGS. 8A and 8B operated by a user to visually present images of article(s) to be used in profile generation, following removal of background areas inapplicable to profile generation and rendering to the display of contour boundaries surrounding foreground areas applicable to profile generation, according to one or more embodiments of the present disclosure.
Figure 8C:
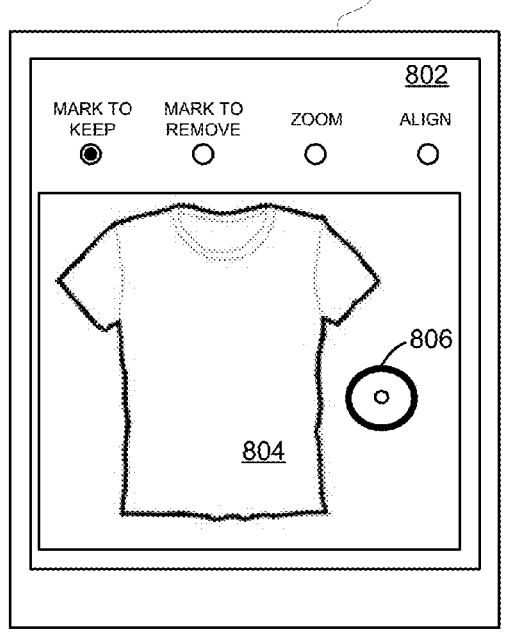

The contour finding process of method 400 may also be iterative. In an initial iteration, performed at 412, the method 400 initiates rendering of one or more grey scale image(s) with contour overlay(s) to the display of a remote display terminal used by a user. The method 400 proceeds to 414 where a determination is made as to whether further refinement is required. If so, the method 400 returns to 412 and another iteration is performed. Once the user is happy with the result (i.e. satisfied that the area enclosed by the respective contour curve(s) encompasses no more and no less than the entirety of each corresponding article, the method 400 returns to 208 of method 200. FIG. 8C depicts the resulting target (reference or commercially available) articles 804 and optional scaling article 806 bounded by their respective contour curve.

Figure 5:
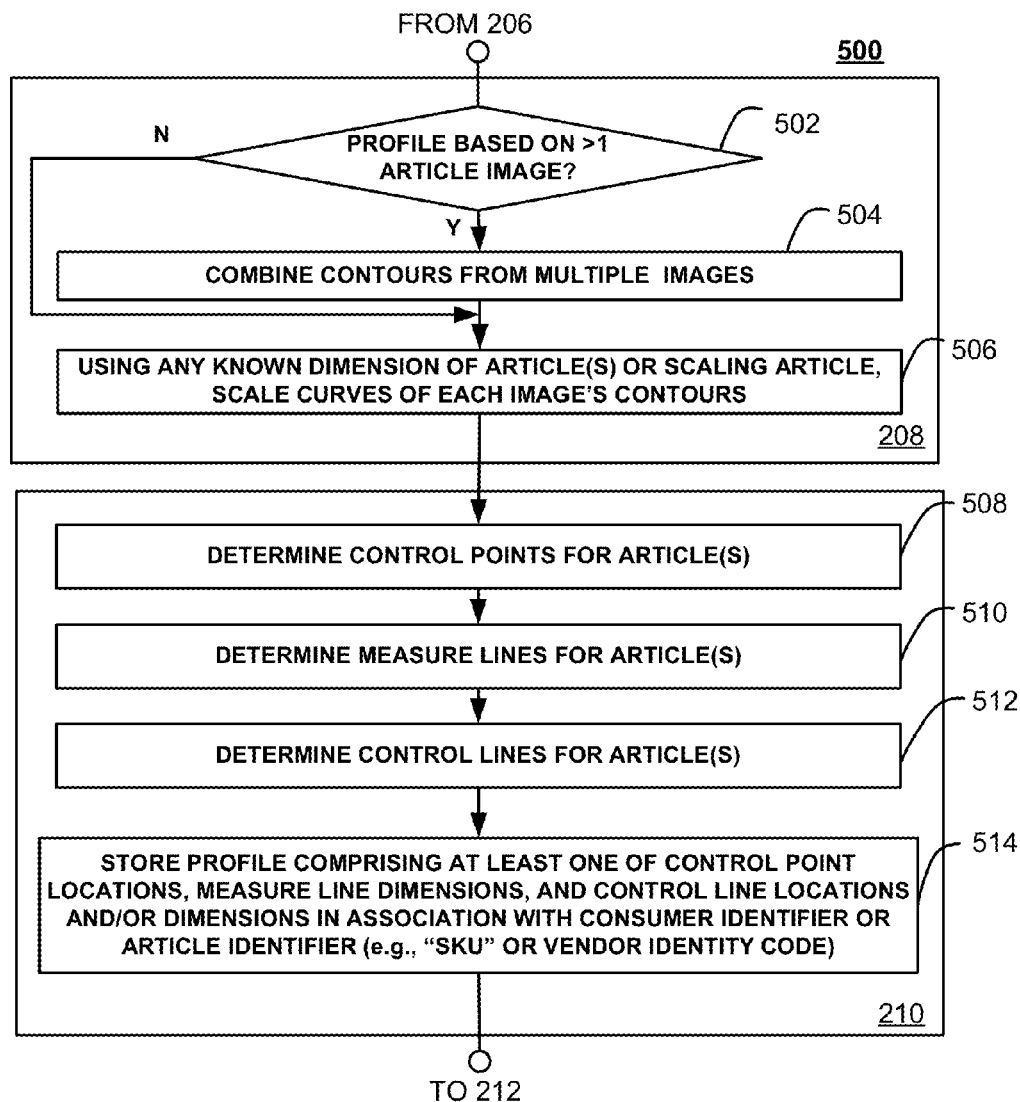
FIG. 5 is a flow diagram of a method for scaling the contours and generating a profile for an article as, for example, a sub-process of the method of FIG. 2, according to one or more embodiments of the present disclosure.

FIG. 5 is a flow diagram of a method 500 for scaling the contours and generating a profile for a target article as, for example, a sub-process of the method 200 of FIG. 2, according to one or more embodiments of the present disclosure. In an embodiment, the method 500 is entered from 206 of method 200, and corresponds to 208 and 210 thereof. More particularly, the method 500 is entered at 502, where a determination is made as to whether the profile(s) to be generated is/are based on the analysis of more than one image of the same article. If the determination is yes, the method 500 proceeds to 504, and the contours from multiple images are combined. By way of illustrative example, a profile of an article such as a shoe or pair of pants requires the contours from different images to be combined and scaled. In this case, the contours of the first of the images serve as a reference. Because the different images are taken from the same apparel article, a dimension (e.g., the height) is presumed to be the same in both images and the dimension from the reference image is therefore used to scale the contours from the second image and any other images corresponding to that same article. If the determination at 502 was no, or following the performance of 504, method 500 proceeds to 506.

At 506, using any known dimension of the target article(s) or scaling article present in an image, method 500 scales the curves of each image's contours. In an embodiment, a contour comprises a linked list of curvilinear and/or linear segments which, for example, may be Bezier curves, B-spline curves, and/or discrete linear segments. In embodiments, each contour starts at a point having the highest y-coordinate value. The expression of contours as mathematical functions enables the minimum value, maximum values to be readily ascertained. Moreover, the overall area encompassed by a contour, the centroid, and the arc lengths can be readily determined.

Once the contour(s) of a target article (and scaling article, if present) have been determined at 506, a profile is created for the target article according to one or more embodiments. To this end, method 500 advances to 508, one of several steps associated with sub-process 210 of method 200.

According to embodiments consistent with the present disclosure, an article profile comprises a set of one or more curves which collectively represent the contour(s) of that article, obtained at 506, and a set of control points, measure lines, and control lines which represent standardized measurements associated with the article. In an embodiment, control points are points (as expressed in an orthogonal coordinate system) of a profile that identify the location of important features in an article. Such features, for example, might include the end of a shoulder, the end of a sleeve, the crotch of a pair of pants. Measure lines are lines connecting two or more control points to give the actual measurement(s) by which the profiles of two or more articles can be compared for fit. Control lines, as used herein, are horizontal lines which cut across contour curves, At 508, method 500 first determines the location of control points along the contour curve(s) of a target article. By simultaneous reference to both FIG. 5 and FIGS. 9A and 9B, an example of the control point determination sub-process 508 will be better understood. Viewing the contour of a pants article of apparel depicted in FIG. 9A, it will be observed that a crotch control point can be identified as a local maximum y-value. Such a point along the contour curve of the pants article can be identified by first localizing the path segment(s) that contain it and then determining the maximum y-value along the segment(s). In this case, then, 508 can be understood to comprise the following sub-steps:

(i) Finding the minimum and maximum y-value of the profile ($Y_{min}$ and $Y_{max}$)

(ii) Defining $Y_{lower} = Y_{min} (Y_{max} Y_{min}) \times 0.10$ (iii) Starting at the beginning of the contour, traversing forwards along the contour to find the point that has a y-value=$Y_{lower}$. This point is identified as point C1 in FIG. 9A.

(iv) Starting at the end of the contour, traversing backwards along the contour to find the point that has a y-value=$Y_{lower}$. This point is identified as point C2 in FIG. 9A.

Figure 9A:
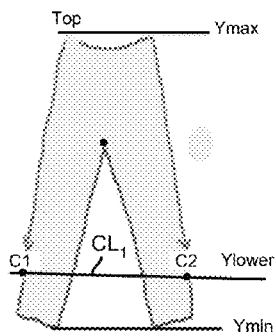
FIG. 9A is an image of an exemplary apparel article showing the locations of relevant reference lines and a control point thereon for use in creating a profile for that article in accordance with the embodiments of the present disclosure.

(v) Starting from point C1, traversing forward on the contour to point C2 to find the point with maximum y-value, identified in FIG. 9A as CP1.

Figure 9C:
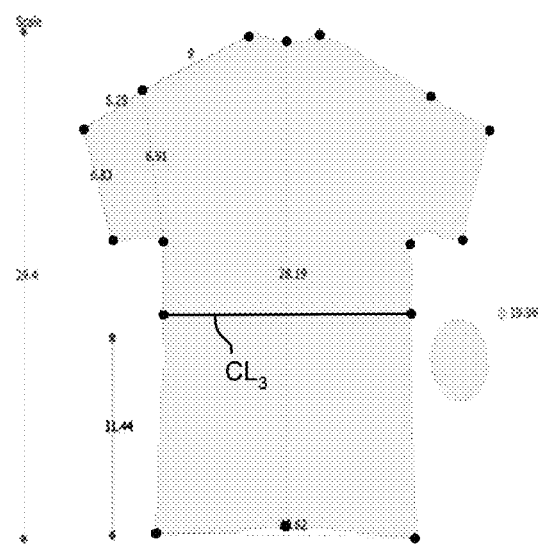
FIG. 9C depicts the arrangement of control points and control lines collectively defining a profile image derived for another apparel article according to embodiments of the present disclosure.
Figure 9B:
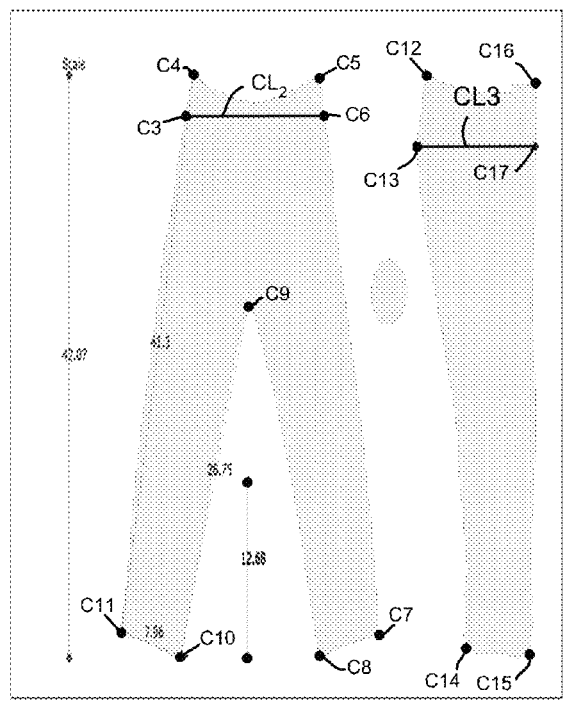
FIG. 9B depicts the arrangement of control points and control lines collectively defining a profile image derived, for the exemplary apparel article of FIG. 9A, according to embodiments of the present disclosure.

After applying similar analysis to locate the remaining control points C2 to C 17, the resulting distribution of control points is shown in FIG. 9B. Method 500 then proceeds to 510 where method 500 determines the location of measure lines, which connect the respective control points in FIG. 9B and thereafter, to 512, where method 500 determines the location of the control lines, indicated at $CL_1$ and $CL_2$ in FIG. 9B. A similar approach to that described above is taken to determine the control points, measure lines, and control lines for other apparel articles such, for example, as the simple, single contour T-shirt article depicted in FIG. 9C.

Following the determination of the scaled contour(s), location of control points, and the location and dimensions of the measure lines and control lines, method 500 proceeds to 514 where method 500 stores a profile for the article in association with a consumer identifier or an article identifier (e.g., a SKU" number or other form of vendor identity or inventory code).

Figure 6:
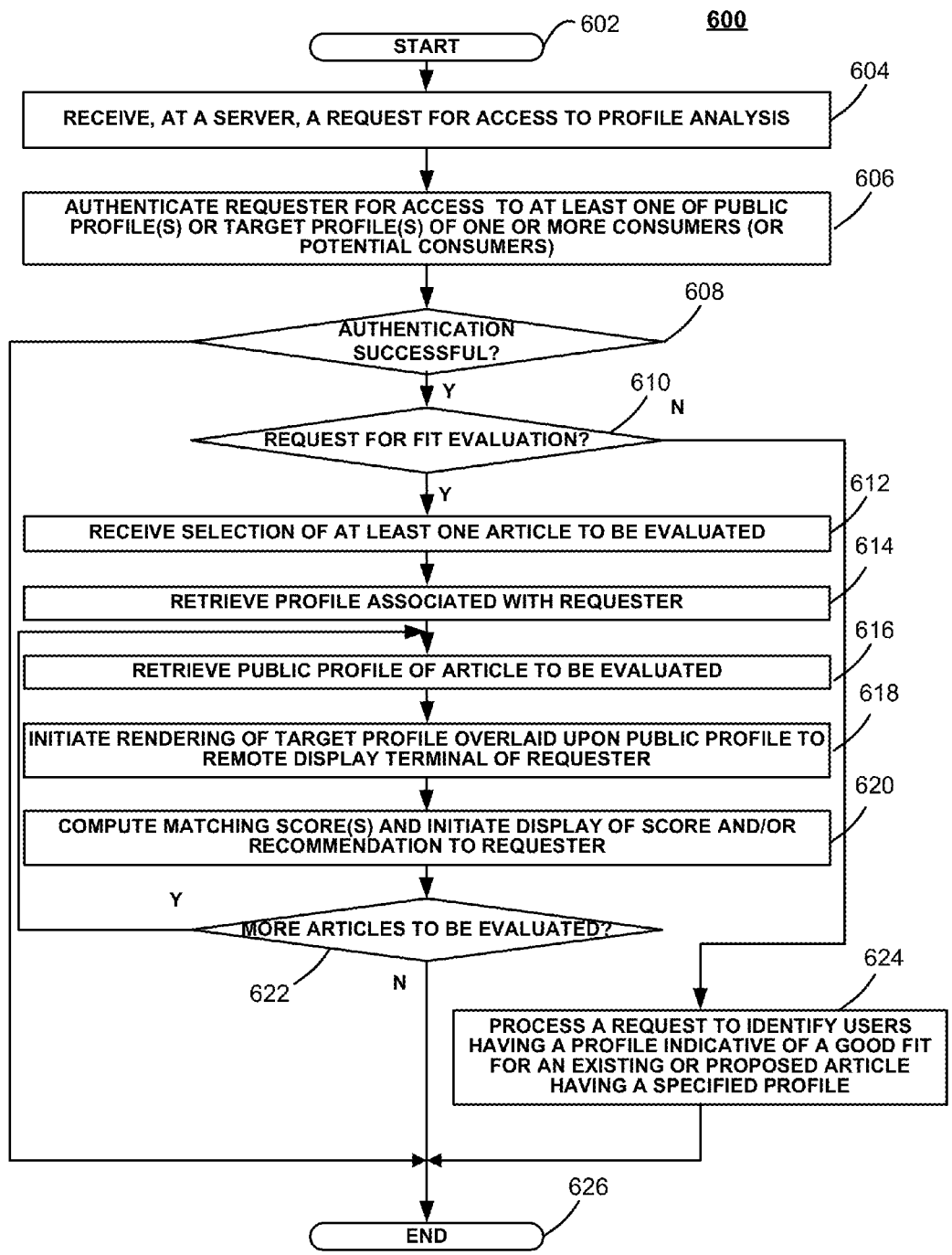
FIG. 6 is a flow diagram of a method for automatically comparing the profile associated with a well-fitting article selected by a consumer and the profile associated with one or more articles being evaluated by an interested party, according to one or more embodiments of the present disclosure.

FIG. 6 is a flow diagram of a method 600 for automatically comparing the profile associated with a well-fitting or well-suited article selected by a consumer and the profile associated with one or apparel articles being evaluated by an interested party, according to one or more embodiments of the present disclosure. In an exemplary use case of embodiments consistent with the present disclosure, a user creates profiles based on the best fitting apparel articles he or she has and then uses these profiles to match against public profiles of clothing items which a vendor is selling via an e-commerce site. In alternate use cases, a vendor may wish to make targeted solicitations at one or more consumers whose respective profile(s) suggest(s) that a single, standardized article already in the vendor's inventory would suit such consumer(s). In the latter case, a particular consumer or group of consumers may have demonstrated, from prior purchases, a preference for the style of product matching or consistent with the genres available from the vendor.

In any event, and with continued reference to FIG. 6, it will be seen that process 600 is entered at 602 and proceeds to 604, where method 600 receives, at a server, a request to profile matching services or other services which require profile analysis. The method 600 then proceeds to 606 where the requesting person or entity is authenticated to access one or more profile(s). The profiles to which access is sought may, for example, be associated with a particular user. Such profiles have been referred to herein as "target" profiles. In embodiments, a user may either access his or her own profiles as part of an online shopping experience or he or she may give access to friends or family members so that they may purchase items for or on behalf of the user without having to "guess" whether an item they purchase will be a good fit. In addition, the profiles to which access is sought may be associated with publicly available (e.g., advertised or placed on sale via an e-commerce site). Such profiles are referred to herein as "public" profiles.

From 606, method 600 proceeds to 608 where a determination is made as to whether authentication was successful. If so, method 600 proceeds to 610, but if not the method 600 proceeds to 626 and terminates. At 610, a further determination is made as to whether an evaluation for article matches or "fit" is to be performed by method 600, based on one or more target and one/or more public profiles for such articles. If the requester is a consumer or is shopping on behalf of a consumer for whom a profile is available, then method 600 proceeds from 610 to 612, where method 600 receives a selection of at least one apparel article to serve as the basis for finding a match among other articles for which a profile is available. The method 600 then proceeds to 614, where method 600 retrieves a target profile of the requester. If the requester is an e-commerce retailer, then method 600 instead proceeds to 624, where a request is processed to identify users having a target profile indicative of a good fit for an existing or proposed article having a specified profile.

From 614, method 600 proceeds to 616, where method 600 retrieves or accesses the public profile(s) of one or more article(s) to be evaluated. In some embodiments, the retrieval which occurs at 616 proceeds based on selection(s) made by a consumer (or an authorized person shopping on behalf of the consumer) over the course of an online shopping experience. By way of example, a consumer may identify a plurality of apparel articles as candidates for purchase from a single vendor, on the basis of price, style, availability, and other criteria. As an additional step, the user may subject these candidates to evaluation for fit consistent with embodiments of the present disclosure. By way of alternate example, a consumer may utilize a single portal to review the offerings of a plurality of vendors. In yet other embodiments, a user indicating that he or she is looking for apparel articles of a particular category and type (e.g., category: SHIRTS and type: T-shirts) may be presented with a display screen containing a number of articles of that type with further screening according to profile availability and profile compatibility (e.g., where the profile(s) include dimensions that are within a range expected to be associated with a good fit).

Figure 9D:
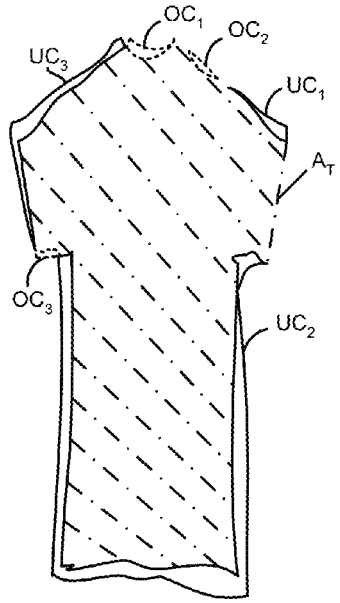
FIG. 9D depicts a superposition of a target profile image applicable to an apparel article selected by or on behalf of a user and a public profile image applicable to an apparel article of the same type, the superposition being shaded to differentiate between areas of overlap, areas covered only by the target profile image, and areas covered only by the public profile image.

In each of the aforementioned cases, for each article selected as a candidate and for which a public profile is available, the public profile is retrieved at 616. From 616, method 600 proceeds to 618, where method 600 initiates rendering—to the display of the display terminal being used by the user to access the profile matching functionality of method 600—of a target profile contour as an overlay upon the public profile contour of a first selected apparel article. In an embodiment, an initial overlay is rendered by finding the centroid for each of a target profile contours and a public profile contour and then aligning these along a reference edge (e.g., the top edge) and horizontal (e.g., x-coordinate in an x-y orthogonal coordinate system) of their respective centroids. An exemplary result is shown in FIG. 9D, where a fitting score of 67 is derived from the area indicated at $A_T$ (bounded by the overcover and undercover areas), where the undercover areas are identified at areas $UC_1$, $UC_2$ and $UC_3$ and where the overcover areas are identified at $OC_1$, $OC_2$, and $OC_3$.

Figure 7:
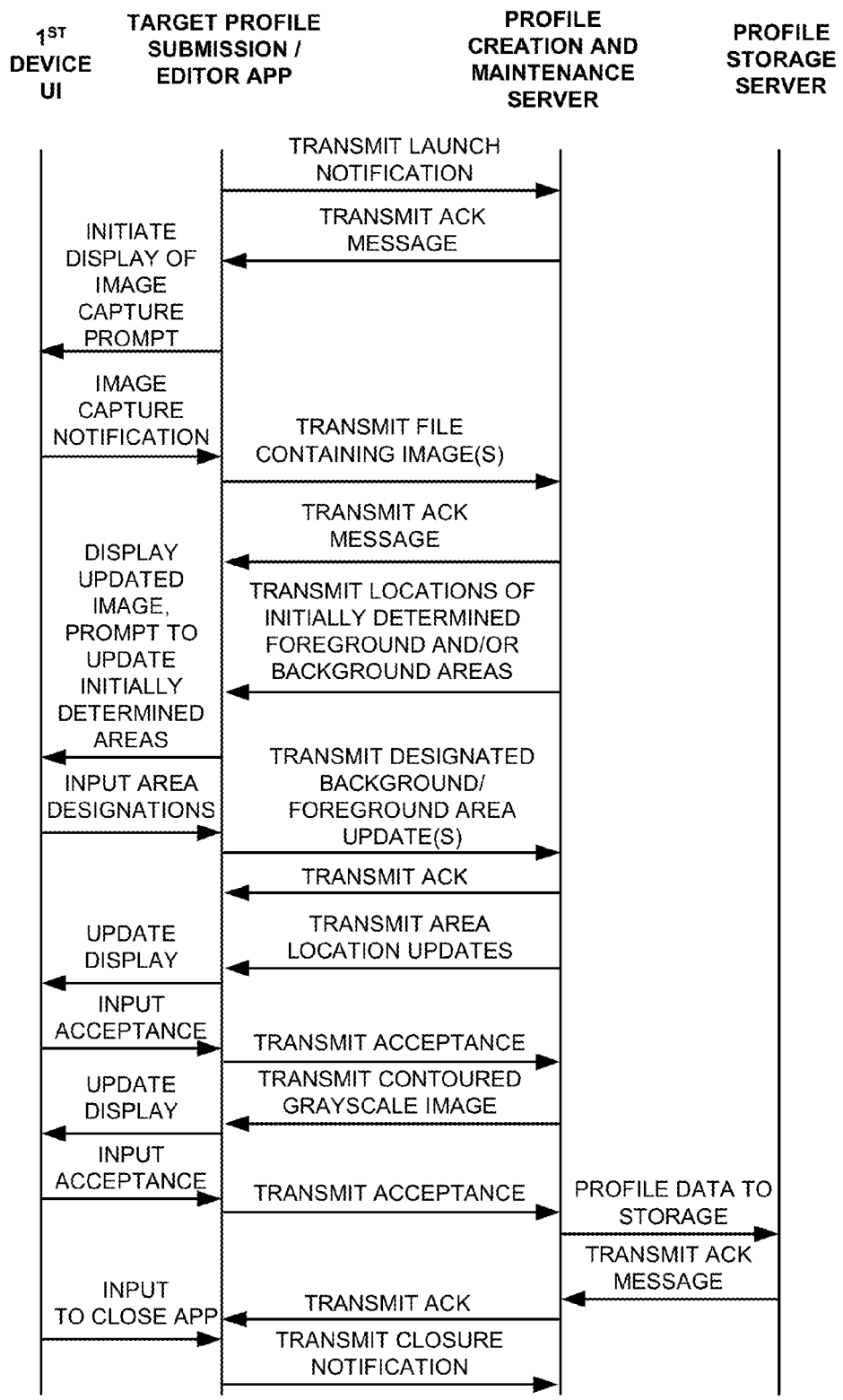
FIG. 7 is a network message flow diagram depicting the exchange of messages, over a communication network, between a display terminal utilized to capture and/or submit an article image and a server which processes the image to develop and/or utilize a profile based on the present disclosure.

FIG. 7 is a network message flow diagram depicting the exchange of messages, over a communication network, between a display terminal utilized to capture and/or submit an article image and a server which processes the image to develop and/or utilize a profile based on the present disclosure. In the exemplary embodiment of FIG. 7, a user of a display terminal accesses a user interface which may be rendered to the display thereof either by local execution of a stored application, or through a browser application connected to a server. In an embodiment, a profile creation request is forwarded to a profile creation and maintenance server as a transmit launch notification message. The server acknowledges receipt of the message and initiates, via the browser (or instructs a local application to initiate), display of an image containing an apparel article for which a profile is to be created. The image may be as captured by the user using an image capture device associated with the same display terminal, or as accessed via a previously stored image file (e.g, as uploaded to the server). In an embodiment, the UI is operated to notify the server of an image capture operation, whereupon the display terminal uploads the image file to the server for image segmentation and contour delineation consistent with embodiments of the present disclosure.

Upon receiving an uploaded image file containing target article and, optionally, a scaling article of known dimension, the server transmits an acknowledge message and data representative of the locations of initially determined foreground and/or background areas for updating of the display at the $1^{st}$ device user interface, The processor of the display terminal executes instructions causing the display to be updated so that one or more automatically generated foreground designations are superimposed upon the areas of a displayed image corresponding to the apparel article and, if present, the scaling article. Likewise, the processor of the display terminal executes instructions causing the display to be updated so that one or more automatically background designations are superimposed upon the areas of a displayed image not corresponding to an apparel article or scaling article. Such initial designations are shown in FIG. 8A as previously described in connection with FIG. 4 above. If the user responds to a displayed instruction or prompt to enter additional background or foreground designations, or to remove any such designations, then these are input via the user interface and transmitted as updates to the server, which acknowledges receipt of the updates and, following processing of these updates, the server transmits information confirming the position of the user-entered supplemental updates. The resulting view, as seen at the user interface of the display terminal, is shown in FIG. 8B as previously described in connection with FIG. 4 above.

Once the user of the display terminal manifests acceptance of the background and foreground designations, that acceptance is transmitted to the server which, in turn, generates a contoured grayscale image that separately encapsulates each respective article (e.g., an apparel article and a scaling article, if present). Data corresponding to this grayscale image is sent to the display terminal, which refreshes the user interface accordingly with the resulting view as shown in FIG. 8C.

The user's acceptance of the delineated contoured image is entered via the user interface of the display device and, thereafter, transmitted to the server which then saves this as part of a scaled, dimensionally accurate profile generated for the article. Consistent with embodiments described previously, the profile further contain measure lines and one or more feature dimensions for use in match filtering processes. The server transmits a message to the display terminal acknowledging receipt of the acceptance and, if no further profiles are to be generated, a user-entered instruction to terminate the invocation of profile generation functionality is processed by the display terminal and transmitted to the server.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 10:
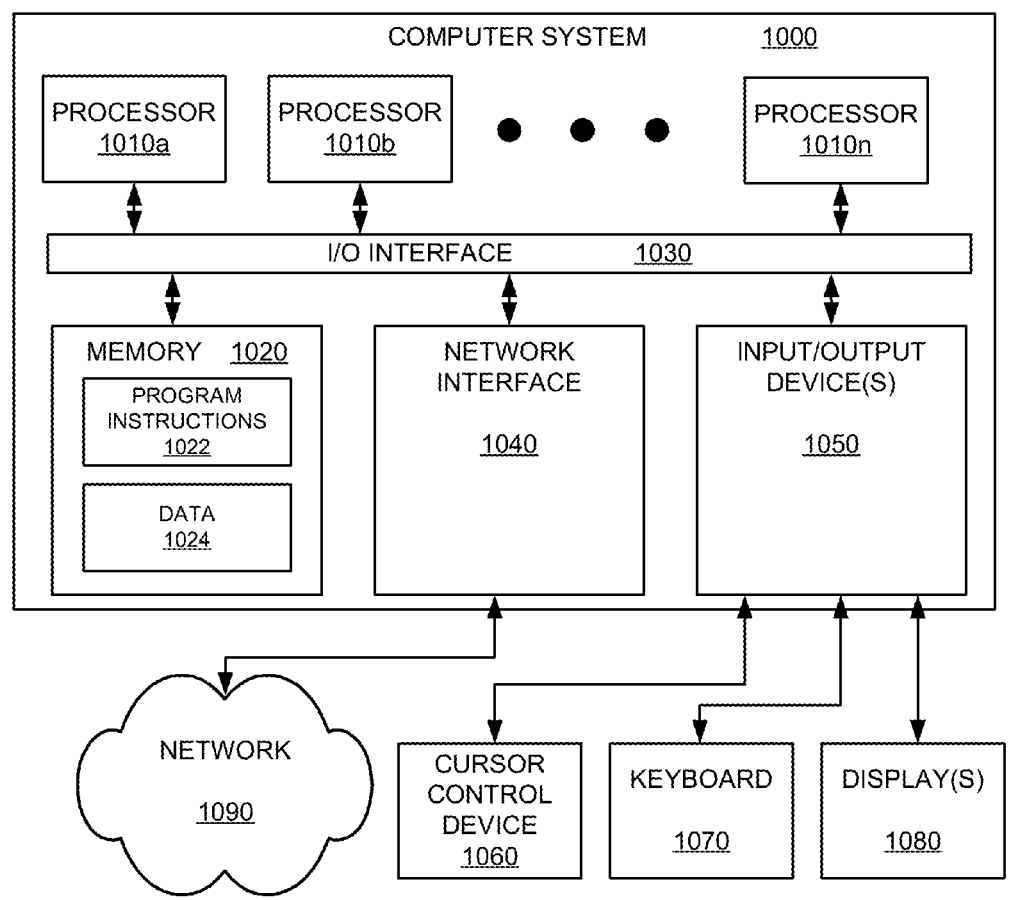
FIG. 10 is a detailed block diagram of a computer system, according to one or more embodiments.

Various embodiments of method and apparatus for creating and matching apparel article profiles on behalf of consumers and/or vendors or prospective vendors of apparel articles, as performed by one or more servers and client devices, as described herein, may be executed on one or more computer systems, which may interact with various other devices. One such embodiment of a computer system is computer system 1000 illustrated by FIG. 10, which may in various embodiments implement any of the elements or functionality illustrated in FIGS. 1-9D. In various embodiments, computer system 1000 may be configured to implement methods described above. The computer system 1000 may be used to implement any other system, device, element, functionality or method of the above-described embodiments. In the illustrated embodiments, computer system 1000 may be configured to implement method 200 (FIG. 2), method 300 (FIG. 3), method 400 (FIG. 4), method 500 (FIG. 5), and/or method 600 (FIG. 6) as processor-executable executable program instructions 1022 (e.g., program instructions executable by processor(s) 1010) in various embodiments In the illustrated embodiment, computer system 1000 includes one or more processors 1010a-1010n coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In various embodiments, any of the components may be utilized by the system to receive user input described above. In various embodiments, a user interface may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, computer system 1000 may be any of various types of devices, including, but not limited to, a personal computer system, desktop computer, laptop, notebook, or netbook computer, mainframe computer system, handheld computer, workstation, network computer, a set top box, a mobile device such as a smartphone or PDA, a consumer device, video game console, handheld video game device, application server, storage device, a peripheral device such as a switch, modem, router, or in general any type of computing or electronic device.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 9100 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more display devices (not shown), or one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the methods described above, such as the methods illustrated by the flowcharts of FIGS. 2-6. In other embodiments, different elements and data may be included.

Those skilled in the art will appreciate that computer system 1000 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method enabling evaluation of the prospective fit of an article, the method being executed on a computer including at least one processor and a memory containing instructions that, when executed by the at least one processor, cause the computer to perform the steps of:
   one of receiving or retrieving image data acquired from an image capture device and representative of at least one of an article image having at least one feature of locally known dimension or an article image of locally unknown dimension together with a scaling article image having at least one known dimension;
   partitioning the image data to form groups of pixels according to at least one of pixel location, color, intensity, or texture, wherein at least one of the groups of pixels formed by the partitioning corresponds to an article represented by the received or retrieved image data and wherein at least one of the groups of pixels formed by the partitioning corresponds to a background area of the received or retrieved image data;
   determining two-dimensional mathematical curves, corresponding to contours of an article represented by a group of pixels formed by the partitioning, to obtain at least one pixel dimension for each article;
   relating the at least one pixel dimension to the at least one known dimension to obtain true dimensions for the at least one pixel dimension;
   generating a profile based on the obtained true dimensions; and
   storing the profile in a memory of a server.

2. The method of claim 1, wherein the received or retrieved image data includes a user designation identifying at least one of a group of pixels corresponding to an article represented by the received or retrieved image data or a group of pixels corresponding to a background area of the received or retrieved image data.

3. The method of claim 2, further including removing pixels belonging to any group of pixels corresponding to a background area and generating a grayscale image for each article image.

4. The method of claim 3, wherein the determining further includes initiating from a server, by execution of instructions of a processor, rendering of at least one greyscale image to a display of a remote display terminal.

5. The method of claim 4, further including receiving further designations of at least one of background or foreground areas entered at the remote display terminal.

6. The method of claim 1, wherein the relating includes combining contours from multiple article images.

7. The method of claim 1, wherein the relating includes scaling curves of article image contours by reference to a scaling article or to known dimensions of a represented article.

8. The method of claim 7, wherein the profile generating includes determining a plurality of control points along scaled curves of an image contour.

9. The method of claim 8, wherein the profile generating includes determining at least one measure line, each measure line connecting a pair of control points.

10. The method of claim 8, wherein the profile generating further includes determining at least one control line.

11. The method of claim 10, wherein the storing comprises storing a profile comprising at least one of control point locations, measure line dimensions, control line locations, or control line dimensions in association with a unique consumer identifier or an article identifier.

12. The method of claim 1, further including receiving, at a server, a request to evaluate an article of clothing for fit,
computing at least one matching score between a profile of an article of clothing associated with a user and at least one profile of a commercially available article; and
initiating display of the at least one matching score, or of a recommendation based on the matching score, to a display of a remote display terminal.

13. The method of claim 1, wherein each article image is representative of a flat article of clothing.

14. The method of claim 1, further including
evaluating suitability of an article for a consumer by reference to a target article profile obtained by the steps of generating and storing, the method being executed by a computer including at least one processor and a memory containing instructions that, when executed by the at least one processor, cause the computer to perform the steps of:
retrieving a stored article profile associated with one of a consumer or a commercially available article; and
determining a corresponding matching score between the target profile and an article associated with the consumer.

15. The method of claim 14, further including receiving, at the server, a request for profile analysis from a requester, and authenticating the requester, and/or initiating rendering of a consumer profile image upon a public profile image to a display of a remote display terminal.

16. The method of claim 14, further including initiating rendering of at least one of the matching score or a recommendation to a remote display terminal associated with a requester, and/or receiving, at the server, a request to identify consumers having a Profile indicative of a good fit for an article having a specified profile.

17. The method of claim 14, wherein the target profile is a profile for an article associated with a consumer, and wherein the retrieving comprises retrieving the at least one public profile.

18. The method of claim 14, wherein the target profile is a public profile, and wherein the retrieving comprises retrieving a profile for an article associated with a consumer.

* * * * *